Patented July 31, 1934

1,968,752

UNITED STATES PATENT OFFICE 1,968,752

DETERGENT COMPOSITION

George S. Evans, Bronxville, N. Y., assignor to The Mathieson Alkali Works, Inc., New York, N. Y., a corporation of Virginia No Drawing. Application January 26, 1933, Serial No. 653,617

6 Claims. (Cl. 87—5)

This invention relates to the manufacture of cakes of detergent material and is particularly concerned with the production of cakes of this character that are especially useful in conditioning the wash water in dish-washing machines. One of the objects of the invention is to provide detergent cakes that will give highly satisfactory results when added to hard water used in dish-washing machines, and this becomes of particular importance in localities where soft water for washing purposes is not available.

My invention contemplates the formation of detergent cakes by melting and then casting into cake form, mixtures of soda ash and other alkalies and tri-sodium phosphate or, in general, any phosphorous compound which when combined with soda ash by fusion, possesses similar properties. In some instances I may employ mixtures of soda ash, caustic soda and phosphorous salts, or the like.

Ordinary tri-sodium phosphate melts at a comparatively low temperature,—approximately 77° centigrade, and it is readily soluble in either hot or cold water. The crystals of ordinary tri-sodium phosphate are almost instantly soluble in water at 120° Fahrenheit. Anhydrous tri-sodium phosphate compounds, however, are known to be slowly soluble in water, and the use of such anhydrous compounds as a detergent in dish-washing machines, either alone or mechanically mixed with soda ash or caustic soda or other alkali is not commercially practicable. Soda ash in the usual pulverulent form is readily soluble in cold or hot water but the rate of solubility of a given quantity of soda ash may be regulated within certain limits by fusing the soda ash and casting the same into lumps, cakes or briquettes. For example, fused soda ash cakes can be used with very desirable results in the ordinary commercial dish-washing machine provided these cakes are of such size and form that the ratio of surface area of each cake in square centimeters to the weight of the cake in grams is between .4 and .5. The type of dish-washing machine here referred to is the usual type employing circulating water and having a capacity of approximately 15 gallons. In such a machine the alkali content of the water may be maintained within the desired range of 75 to 150 grains per gallon by merely adding fused soda ash cakes of the form above referred to at intervals of—say 40 minutes. In such machines the water is usually replaced at the rate of one gallon per minute, or, in other words, one gallon of fresh water is added each minute and a gallon of the re-circulating water is discharged each minute through an overflow conduit. Where it is necessary to use hard water in dish-washing machines, fused soda ash cakes do not give as good results as cakes formed by fusing mixtures of soda ash and phosphorous compounds such as tri-sodium phosphate.

I have discovered that although the process of fusing mixtures of soda ash and tri-sodium phosphate drives off the water of crystallization of the tri-sodium phosphate, yet the resulting product has a water solubility characteristic comparable to that of fused cakes of soda ash. It appears that although the crystalline tri-sodium phosphate is probably converted into a form of anhydrous tri-sodium phosphate yet the resulting blended product is much more soluble than anhydrous tri-sodium phosphate.

In preparing the mixture of soda ash and tri-sodium phosphate I may employ 1 to 9 parts of tri-sodium phosphate with 1 to 9 parts of soda ash, or, in other words, the percentage of soda ash may vary from 10 to 90 per cent and likewise the percentage of tri-sodium phosphate may vary from 10 to 90 per cent. Under certain conditions it may be desirable to employ relatively smaller or larger amounts of either of these ingredients although, in general, satisfactory results may be obtained by using mixtures containing 10 to 60 per cent of tri-sodium phosphate or, in other words, mixtures containing—say 18 parts by weight of soda ash and 2 to 27 parts by weight of tri-sodium phosphate. For most purposes I prefer to use mixtures of tri-sodium phosphate and soda ash in which the tri-sodium phosphate constitutes from 40 to 60 per cent of the mixture. Mixtures containing a lower percentage of tri-sodium phosphate are less expensive than mixtures containing a larger proportion of this ingredient but where extremely hard water conditions obtain it is desirable to use a 50—50 mixture, or an even higher percentage of tri-sodium phosphate or the like. As indicated above, the soda ash and tri-sodium phosphate may be blended in the proportions by weight of 6 parts soda ash to 4 to 9 parts tri-sodium phosphate.

As mentioned above, the solubility of the fused cakes of soda ash and tri-sodium phosphate is comparable to that of fused cakes consisting essentially of soda ash. It accordingly appears that the presence of the soda ash in the compound is responsible for the high solubility of the product resulting from blending the soda ash and tri-sodium phosphate by fusion, even though the water of crystallization is driven off during the fusing operation. This operation may be performed at a furnace temperature of 1700 to 2200° Fahrenheit. Although the solubility of my improved product is comparable to that of fused soda ash, yet partially dissolved cakes embodying my invention have a distinctive appearance. Fused soda ash cakes, when partially dissolved, have a relatively smooth surface, whereas, fused composite cakes embodying my invention have an irregular or wavy surface when partially dissolved.

As stated above, the mixture is fused at a high temperature and accordingly the fusion may be characterized as dry fusion for it liquefies the crystalline salts after the expulsion of the water of crystallization.

The rate of solubility of crystalline tri-sodium phosphate is too high for many applications, and the melting point is so low that the crystals will melt at comparatively low temperatures. Anhydrous phosphate compounds, on the other hand, are ordinarily too insoluble for many applications. By blending tri-sodium phosphate and soda ash in accordance with my invention, it is possible to control the solubility of the phosphate compound, thus making such compounds more useful for a variety of purposes and especially for use in dish-washing machines and the like.

The solubility of my improved product may be varied within certain limits by additions of sodium silicate. For example, a quantity of silica or sodium silicate may be added to the mixture of soda ash and tri-sodium phosphate, the quantity of silica or sodium silicate representing—say from 1 to 10 per cent of the mixture by weight. The resulting mixture may then be fused and cast into cake form.

It is to be understood that my invention is not limited to the particular embodiments thereof described in detail, but includes such modifications thereof as fall within the scope of the appended claims.

I claim:—

1. A dry-fused detergent alkaline salt mixture in the form of a solid body comprising as essential ingredients tri-sodium phosphate and soda ash blended in the proportions by weight of 1 to 9 parts of tri-sodium phosphate to 1 to 9 parts of soda ash.

2. A dry-fused detergent alkaline salt mixture in cake form comprising as essential ingredients tri-sodium phosphate and soda ash blended in the proportions by weight of 18 parts soda ash to 2 to 27 parts tri-sodium phosphate.

3. A dry-fused detergent alkaline salt mixture in cake form comprising as essential ingredients tri-sodium phosphate and soda ash blended in the proportions by weight of 6 parts soda ash to 4 to 9 parts tri-sodium phosphate.

4. A dry-fused detergent alkaline salt mixture in cake form comprising as essential ingredients tri-sodium phosphate and soda ash blended in the proportions by weight of approximately 6 parts soda ash to 4 parts of tri-sodium phosphate.

5. A dry-fused detergent alkaline salt mixture in cake form comprising as essential ingredients tri-sodium phosphate and soda ash blended in the proportions by weight of approximately one part soda ash to one part tri-sodium phosphate.

6. A dry-fused detergent alkaline salt mixture in cake form comprising as essential ingredients tri-sodium phosphate, soda ash and sodium silicate blended in the proportions by weight of 1 to 9 parts soda ash to 1 to 9 parts tri-sodium phosphate and the quantity of sodium silicate being less than 10% of the weight of the mixture.

GEORGE S. EVANS.